US007488135B2

(12) United States Patent
Hasegawa

(10) Patent No.: US 7,488,135 B2
(45) Date of Patent: Feb. 10, 2009

(54) FASTENING DEVICE

(75) Inventor: Sadayoshi Hasegawa, Inazawa (JP)

(73) Assignee: Aoyama Seisakusho Co., Ltd., Aichi (JP)

(*) Notice: Subject to any disclaimer, the term of this patent is extended or adjusted under 35 U.S.C. 154(b) by 0 days.

(21) Appl. No.: 10/885,241

(22) Filed: Jul. 7, 2004

(65) Prior Publication Data
US 2005/0025566 A1    Feb. 3, 2005

(30) Foreign Application Priority Data
Jul. 29, 2003   (JP)   ............................. 2003-281482

(51) Int. Cl.
*F16B 7/06*   (2006.01)
(52) U.S. Cl. ............................. 403/48; 403/22; 403/43; 403/167; 403/168; 403/408.1
(58) Field of Classification Search ............ 403/408.1, 403/167, 168, 22, 43, 48; 411/546, 182, 411/171, 366.1, 82.2; 470/10
See application file for complete search history.

(56) References Cited

U.S. PATENT DOCUMENTS

| 5,288,191 | A | * | 2/1994 | Ruckert et al. | ............. | 411/432 |
| 5,340,258 | A | * | 8/1994 | Simon | ............. | 411/535 |
| 5,511,301 | A | * | 4/1996 | McGuire | ............. | 411/368 |
| 6,227,783 | B1 | * | 5/2001 | Salameh | ............. | 411/353 |
| 6,318,927 | B1 | * | 11/2001 | Schafer et al. | ............. | 403/408.1 |
| 6,357,953 | B1 | * | 3/2002 | Ballantyne | ............. | 403/43 |
| 6,776,566 | B2 | * | 8/2004 | Kobusch et al. | ............. | 411/546 |
| 6,789,993 | B2 | * | 9/2004 | Ozawa et al. | ............. | 411/546 |
| 6,872,040 | B2 | * | 3/2005 | Deeg et al. | ............. | 411/353 |
| 6,884,014 | B2 | * | 4/2005 | Stone et al. | ............. | 411/352 |
| 2002/0150445 | A1 | * | 10/2002 | Ozawa et al. | ............. | 411/546 |

(Continued)

FOREIGN PATENT DOCUMENTS

CN    1386655 A    12/2002

(Continued)

OTHER PUBLICATIONS

Kalpakjian, Serope, Manufacturing Engineering and Technology, 1995, Addison-Wesley, Third Edition, pp. 372-374.*

(Continued)

*Primary Examiner*—Michael P Ferguson
(74) *Attorney, Agent, or Firm*—Steptoe & Johnson LLP

(57) ABSTRACT

A fastening device permitting two separate members to be fixed together with a relative interval between them including a bolt with a male screw portion formed at a front end side of a cylindrical shaft portion thereof and a spacer having a female screw portion engaging a male screw portion and screw-fastens with a screw of a first member side and rotates while receiving a rotation torque from the bolt and moves up to a position in which it comes into a contact with a second member. The root diameter of a male screw portion is smaller than the diameter of a cylindrical shaft portion while the inside diameter of the female screw portion is larger than the diameter of the cylindrical shaft portion. Consequently, the cylindrical shaft portion can be passed through the female screw portion even if the diameter of the cylindrical shaft portion is not reduced in diameter by cutting processing.

3 Claims, 14 Drawing Sheets

U.S. PATENT DOCUMENTS

2002/0154966 A1* 10/2002 Stone et al. .................. 411/352
2002/0176739 A1 11/2002 Goto et al.
2003/0077118 A1* 4/2003 Kobusch et al. .......... 403/408.1
2003/0077142 A1* 4/2003 Stone et al. .................. 411/107

FOREIGN PATENT DOCUMENTS

| EP | 1 260 717 | 11/2002 |
| GB | 1124530 | 8/1968 |
| JP | 10-176709 | 6/1998 |
| JP | 2001-304208 | 10/2001 |
| JP | 2002-347656 | 12/2002 |
| WO | WO 03029666 * | 4/2003 |

OTHER PUBLICATIONS

Machinery's Handbook, 2000, Industrial Press, vol. 26, pp. 1890, 1891, 1900-1907.*

* cited by examiner

Fig. 10
Fig. 11
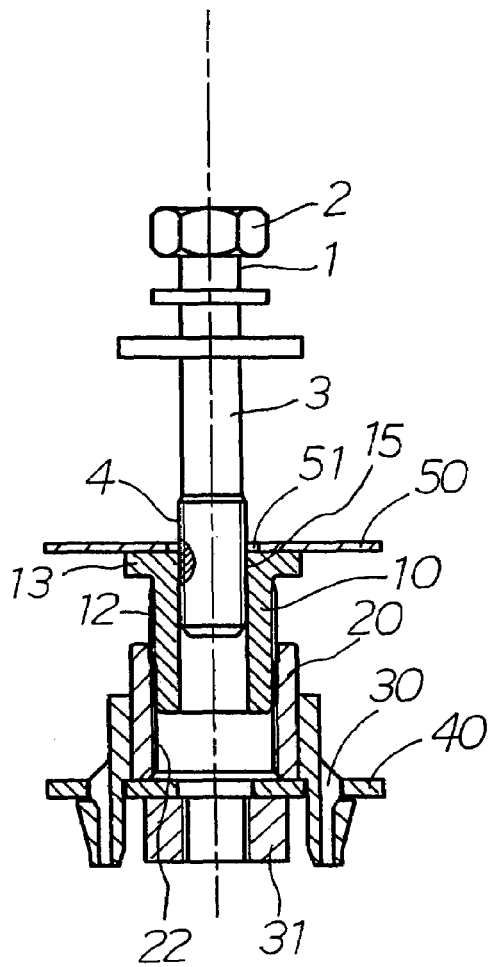
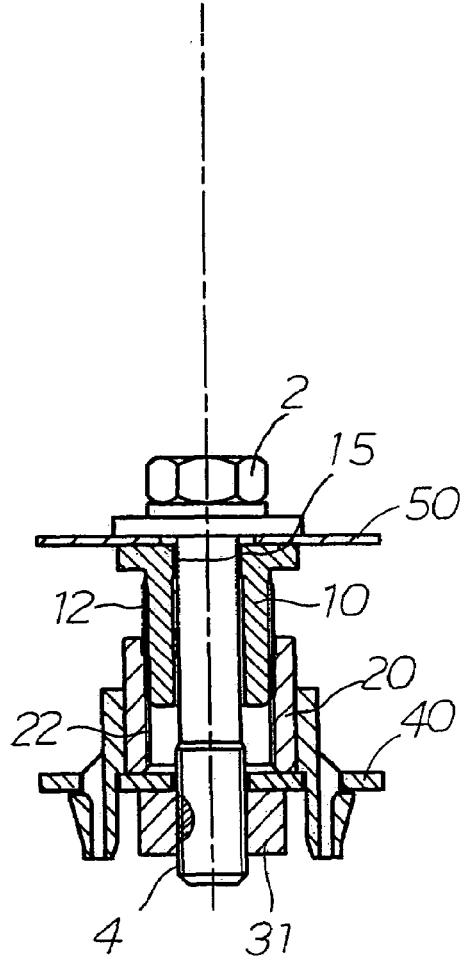

Fig.15
Fig.16
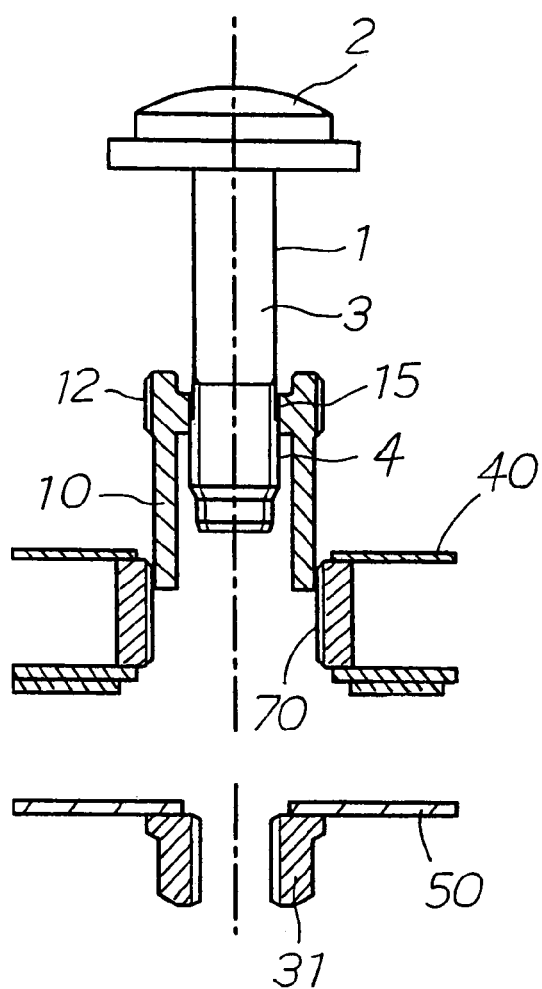
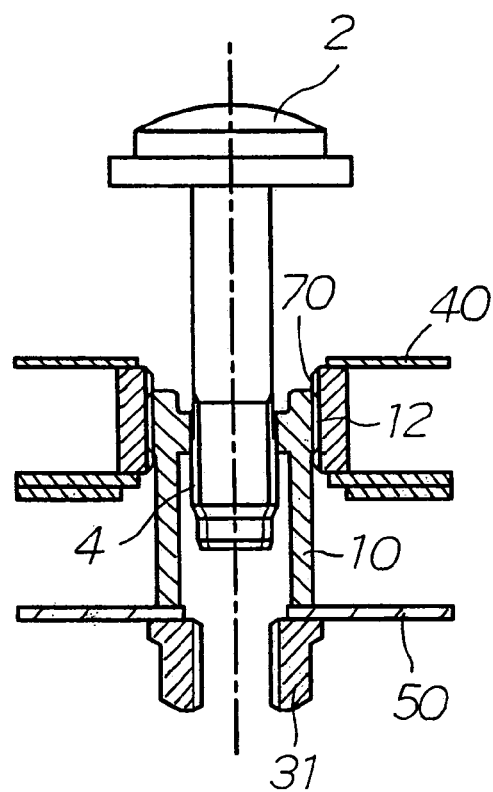

Fig. 17
Fig. 18
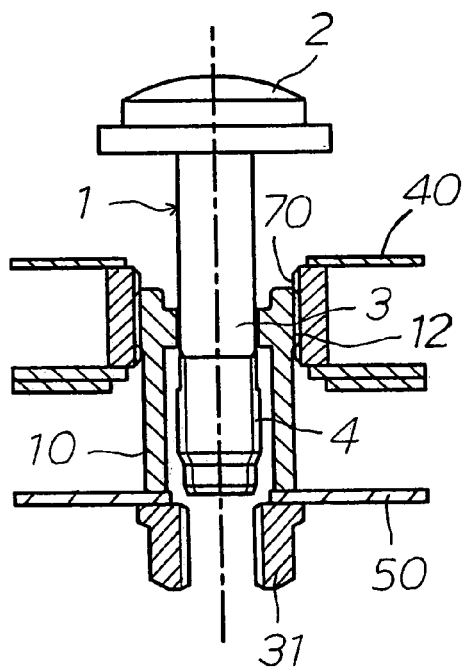
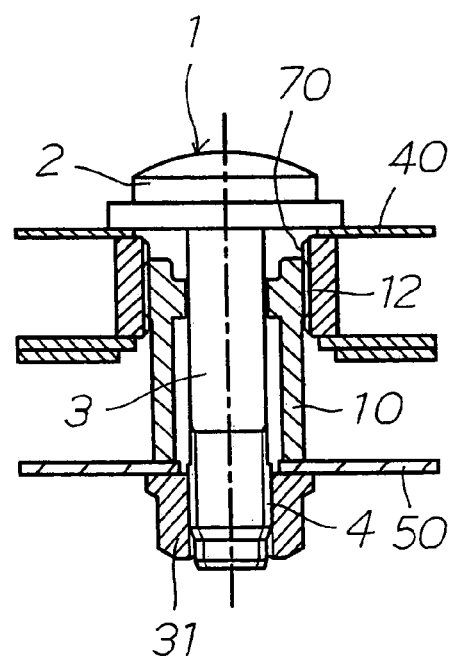

FASTENING DEVICE

BACKGROUND OF THE INVENTION

The present invention relates to a fastening device for fastening two separate members with each other with a relative interval between them.

Conventionally, the fastening devices for fastening two members with a relative interval between them have been already disclosed in the technical field of automobile and the like. For example, Japanese Patent Application Laid-Open No. 2002-347656 has disclosed a fastening device comprising a sleeve welded on one component of the two separate members, a spacer screw-fastening with the sleeve through an inverse screw and a bolt having a male screw portion capable of screw-fastening with a female screw portion formed in the spacer at a front end of a shaft portion.

The male screw portion of the bolt of this fastening device is coated with adhesive agent capable of transmitting a predetermined torque to the spacer and when the bolt is tightened, the spacer is rotated due to a transmission torque, so that it is pulled out from the sleeve. However, because if the spacer comes into a contact with the other member, it cannot rotate further, the male screw portion formed at the front end of the bolt is released from the female screw portion and advanced so as to screw-fasten with the female screw portion of the sleeve, so that the two members are fastened with each other with an interval by the spacer. To allow the bolt to be advanced quickly at this time, it is preferable to obtain a structure capable of passing through the female screw portion of the spacer without rotating the shaft portion of the bolt.

Because such a bolt is produced at the front end portion of a cylindrical blank according to the method of rolling the male screw portion, the root diameter of the male screw portion is formed smaller than the blank diameter (diameter of a cylindrical portion) of the bolt. Thus, because the inside diameter of the female screw portion of the spacer which screw-fastens with the male screw portion is smaller than the diameter of the cylindrical portion of the bolt, the cylindrical portion of the bolt cannot pass through the female screw portion of the spacer. Thus, the cylindrical portion of the bolt needs to be reduced in diameter by additional processing such as cutting processing and plastic deformation so that it is capable of passing through the female screw portion of the spacer. For the reason, processing steps for the bolt increases and further, manufacturing cost rises.

SUMMARY OF THE INVENTION

Accordingly, the present invention has been accomplished to solve the above described conventional problem and an object of the invention is to provide a fastening device which enables a bolt to be produced by rolling at a low cost and is capable of fixing together two separate members with a relative interval between them like the conventional product.

To achieve the above-described object, according to the present invention, there is provided a fastening device comprising a bolt in which a male screw portion is formed at a front end of a cylindrical shaft portion thereof and a female screw portion which engages the male screw portion of the bolt, the fastening device further comprising a spacer which is screw-fastened with a screw of the first member side and rotated while receiving a rotation torque from the bolt through a torque transmitting means provided between the both so that it moves up to a position apart from the first member in which it collides with a second member, when the spacer moves to the position in which the spacer collides with the second member, the male screw portion of the bolt being released from the female screw portion of the spacer so as to fix the first member and the second member together, wherein the root diameter of the male screw portion of the bolt is smaller than the diameter of the cylindrical shaft portion while the inside diameter of the female screw portion of the spacer is larger than the diameter of the cylindrical shaft portion of the bolt.

The screw of the first member side may be formed in the sleeve provided on the first member or directly in the first member. Further, the screw of the spacer which screw-fastens with the screw of the first member side may be of inverse screw or of normal screw. Further, the female screw portion which screw-fastens with the male screw portion of the bolt released from the female screw portion of the spacer may be a nut welded on one member or a nut which is held by one member such that it can be played. As the torque transmitting means provided between the male screw portion of the bolt and the female screw portion of the spacer, various means such as a method of modifying part of the thread and covering part of the thread with elastic agent can be adopted appropriately as well as the method with adhesive agent.

The fastening device of the present invention is used for fixing the first and second members kept separately with a relative interval between them and the male screw portion of the bolt is fastened with the female screw portion of the spacer so as to transmit a torque to the spacer and the spacer is moved up to a position in which it collides with the second member. Because with this condition, the rotation of the spacer is stopped, the male screw portion of the bolt is released from the female screw portion of the spacer and advanced so as to fix the first member and the second member together, like the conventional fastening device.

However, because in the fastening device of the present invention, the root diameter of the male screw portion of the bolt is smaller than the diameter of the cylindrical shaft portion and the inside diameter of the female screw portion of the spacer is larger than the diameter of the cylindrical shaft portion of the bolt, the cylindrical shaft portion of the bolt can be passed through the female screw portion of the spacer even if the diameter of the cylindrical portion of the bolt is not reduced in diameter by additional processing such as cutting processing and plastic deformation. Because the bolt can be produced by only rolling and no additional processing is needed for the cylindrical shaft portion, manufacturing cost does not rise so much. Although according to the present invention, engagement between the male screw portion of the bolt and the female screw portion of the spacer is shallower than in the conventional product, by providing at least one of the male screw portion of the bolt and the female screw portion of the spacer with a torque transmitting means, the rotation force of the bolt can be transmitted effectively to the spacer so that the spacer can be pulled out smoothly and securely from the sleeve.

BRIEF DESCRIPTION OF THE DRAWINGS

FIG. 10 is a sectional view showing a condition in which the spacer makes a contact with a second member;

FIG. 11 is a sectional view showing a completion condition of the fastening;

FIG. 15 is a sectional view showing the initial stage of fastening with a fastening device of a fifth embodiment;

FIG. 16 is a sectional view showing a condition in which the spacer makes a contact with the second member;

FIG. 17 is a sectional view showing a condition in which the engagement between the male screw portion of the bolt and the female screw portion of the spacer is released; and FIG. 18 is a sectional view showing a completion condition of the fastening.

DETAILED DESCRIPTION OF THE PREFERRED EMBODIMENTS

First Embodiment

Figure 1:
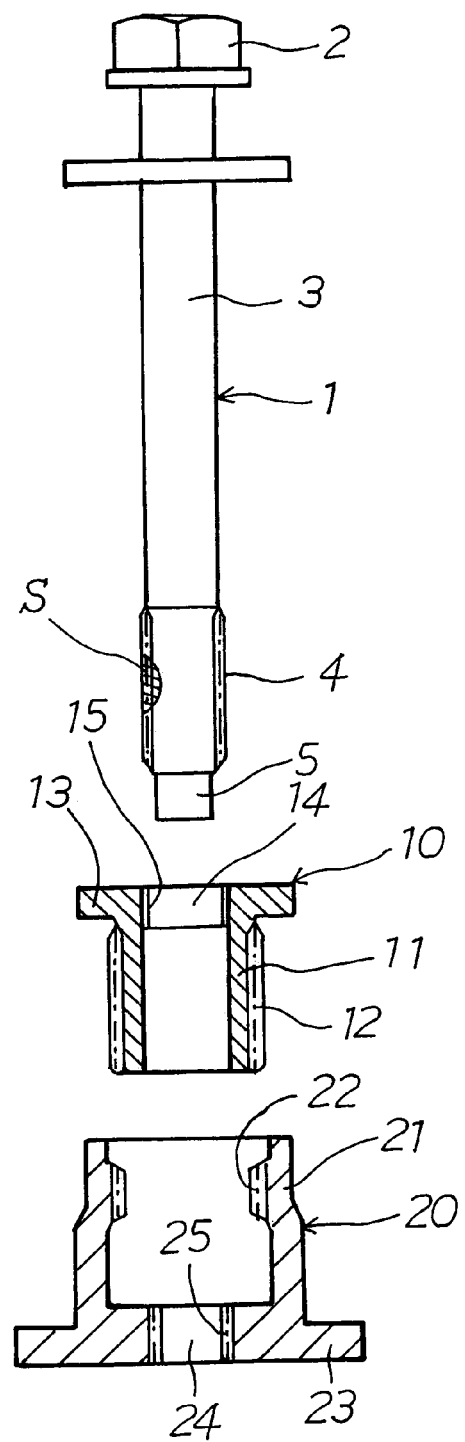
FIG. 1 is a disassembly diagram showing a fastening device of the first embodiment.
Figure 2:
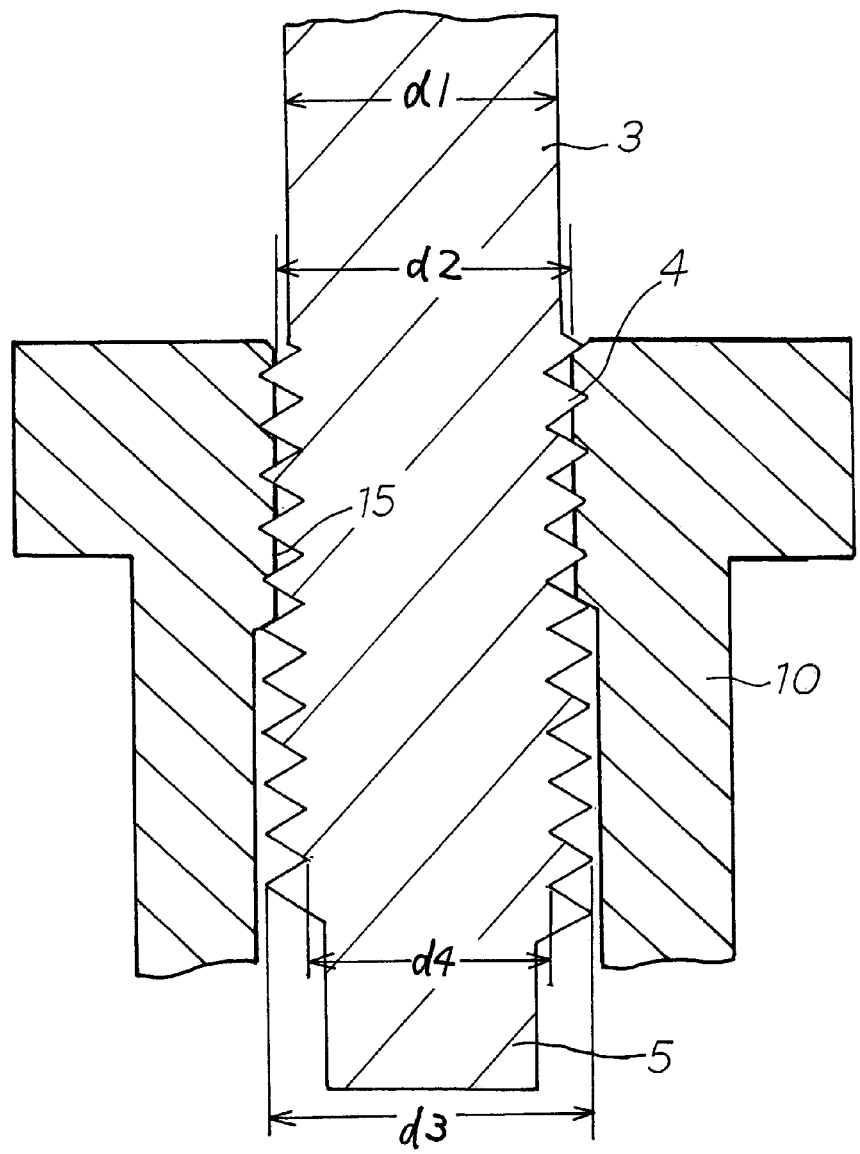
FIG. 2 is an enlarged view showing a screw-fastening portion between the bolt male screw portion and the female screw portion of the spacer.

FIGS. 1-6 show the first embodiment of the present invention and the fastening device of this embodiment comprises a bolt 1, a spacer 10 and a sleeve 20. The bolt 1 is constituted of a head portion 2, a cylindrical shaft portion 3 and a normal screw type male screw portion 4 formed on a front end thereof. The male screw portion 4 is formed by rolling a blank having the same diameter as the cylindrical shaft portion 3 and the cylindrical shaft portion 3 is not subjected to reduction of its diameter by cutting processing or the like. Thus, as shown in FIG. 2, the thread diameter d3 of the male screw portion 4 of the bolt 1 is larger than the diameter d1 of the cylindrical shaft portion 3 and the root diameter d4 of the male screw portion 4 is smaller than the diameter d1 of the cylindrical shaft portion 3. In the meantime, a rod portion 5, which is smaller in diameter than the root diameter d4 of the male screw portion 4, is formed at the front end of the male screw portion 4. According to this embodiment, the male screw portion 4 is coated with adhesive agent S as a torque transmitting means for transmitting a rotation force of the bolt to the spacer 10. The adhesive agent S used here is nylon which is marketed in the name of "TORQ-PATCH" having a permanent plasticity. However, the torque transmitting means is not restricted to the adhesive agent S but it is permissible to adopt an appropriate means by, for example, transmitting a predetermined torque by deforming part of the thread.

The spacer 10 is comprised of a cylindrical portion 11 and a sheet-like portion 13 extending outward from an outer periphery of one end of the same cylindrical portion 11. An inverse screw type male screw portion 12 is formed in the outer peripheral face of the cylindrical portion 11. A screw hole 14 smaller than the inner diameter of the cylindrical portion 11 is formed in the central portion of the sheet-like portion 13. A female screw portion 15 capable of screw-fastening the male screw portion 4 of the bolt 1 is formed in the peripheral face of this screw hole 14. As described later, the crests of the threads of the female screw portion 15 of the spacer 10 are cut out in a predetermined quantity.

The sleeve 20 has an inner diameter substantially equal to the outer diameter of the cylindrical portion 11 of the spacer 10 and has a cylindrical portion 21 extending slightly longer than the cylindrical portion 11. A female screw portion 22 which is an inverse screw capable of screw-fastening the male screw portion 12 formed on the outer peripheral face of the cylindrical portion 11 of the spacer 10 is formed in the inner peripheral face of the cylindrical portion 21.

Further, a sheet-like portion 23 having a predetermined thickness is provided at an end portion of the cylindrical portion 21 of the sleeve 20 such that it closes an opening portion of the cylindrical portion 21. This sheet-like portion 23 is in a larger diameter than the cylindrical portion 21 and a screw hole 24 having a smaller diameter than the inner diameter of the cylindrical portion 21 is made substantially in the central portion of the sheet-like portion 23. A female screw portion 25 capable of screw-fastening the male portion 4 of the bolt 1 is formed in the peripheral face of this screw hole 24. This female screw portion 25 has a normal thread shape corresponding to the male screw portion 4 of the bolt 1.

The male screw portion 4 of the bolt 1 screw-fastens with the female screw portion 15 of the spacer 10. As shown in FIG. 2, the section of the thread of the male screw portion 4 of the bolt 1 is triangular and the section of the thread of the female screw portion 15 of the spacer 10 is substantially trapezoidal because its crest is cut out. The inner diameter d2 of the female screw portion 15 is larger than the diameter d1 of the cylindrical shaft portion 3 of the bolt 1. That is, the root diameter d4 of the male screw portion 4 of the bolt 1 is smaller than the diameter d1 of the cylindrical shaft portion 3 and the inside diameter d2 of the female screw portion of the spacer 10 is larger than the diameter d1 of the cylindrical shaft portion 3 of the bolt 1. Thus, there is a relation of d2>d1>d4.

To form the configuration in which the crests of the threads of the female screw portion 15 are cut out, it is permissible to, after the screw shape is formed on the peripheral face of the screw hole 14 of the spacer 10, cut out the crests of the threads so that the inside diameter thereof is constant or after the screw hole 14 whose inside diameter is of the aforementioned constant diameter is formed, form the screw shape in the peripheral face of the screw hole 14.

A method for maintaining and fixing the two separate members using the aforementioned fastening device will be described with reference to FIGS. 3-6. Here, a case of fastening a first member 40 with a second member 50 located at a distance L1 with an interval maintained will be described. The first member 40 is, for example, a side plate of automobile and the second member 50 is, for example, automobile front pillar.

Figure 3:
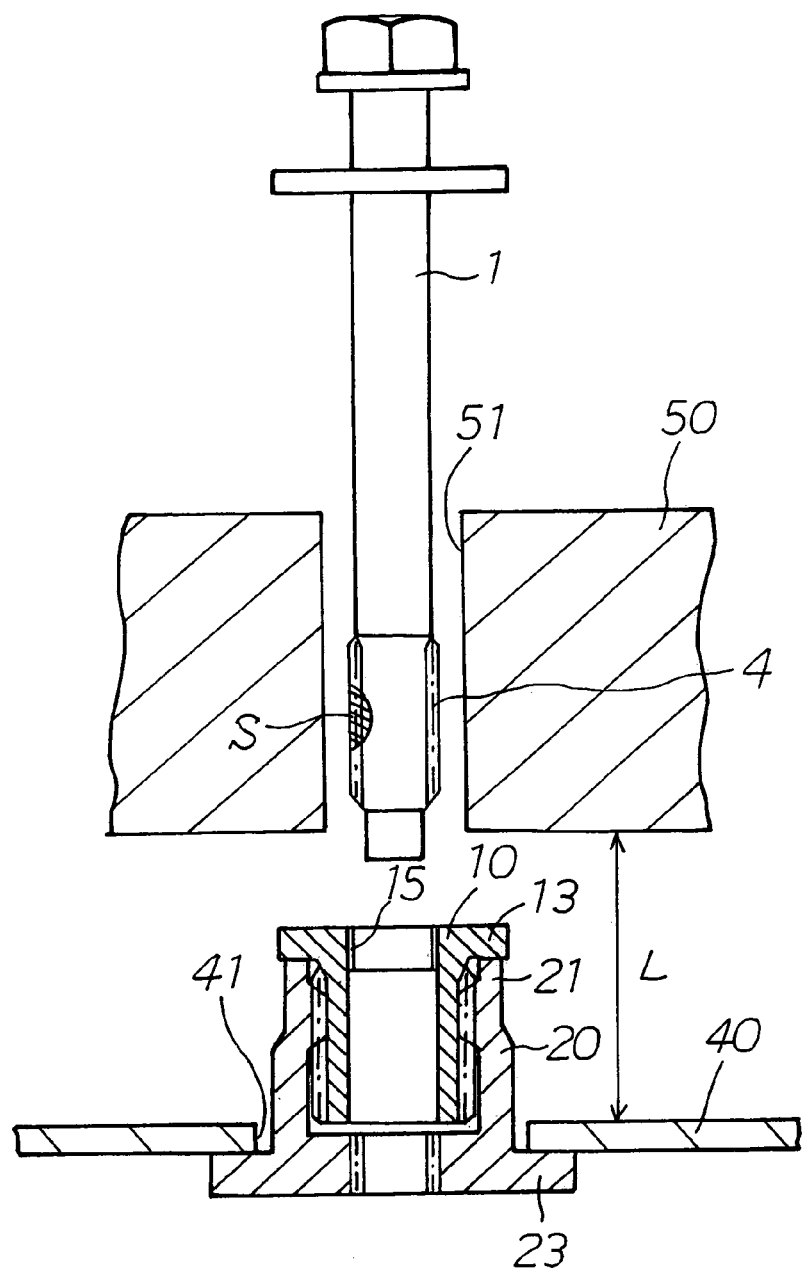
FIG. 3 is a sectional view showing the initial stage of fastening with the fastening device of the first embodiment.
Figure 4:
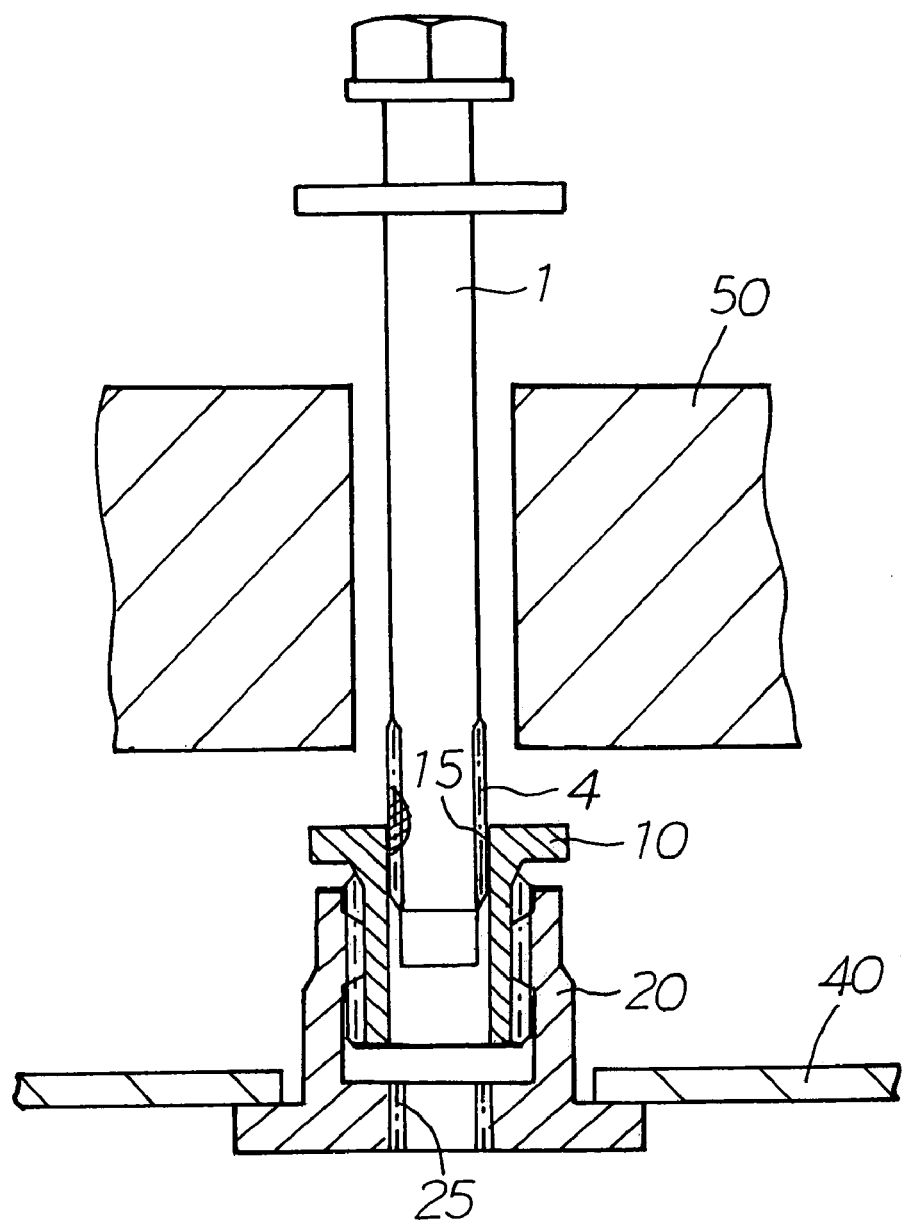
FIG. 4 is a sectional view showing a condition in which the spacer is moved by a rotation of the bolt.

As shown in FIG. 3, first, the sleeve 20 is fixed to the first member 40. More specifically, after the cylindrical portion 21 of the sleeve 20 is inserted into the through hole 41 provided in the first member 40, the sheet-like portion 23 is brought into a contact with an face opposite to the insertion direction of the sleeve 20 of the first member 40 and both the members are fixed together by welding. The spacer 10 is screw-fastened with the sleeve 20 completely until the sheet-like portion 13 of the spacer 10 makes a contact with the cylindrical portion 21 of the sleeve 20. As described previously, according to this embodiment, the spacer 10 is screw-fastened with the sleeve 20 through the inverse screw.

Next, the bolt 1 is inserted into the through hole 51 made in the second member 50 from the opposite side of the first member 40. Then, if the bolt 1 is rotated in the normal screwing direction (clockwise direction) with the male screw portion 4 of the bolt 1 screw-fastened with the female screw portion 15 of the spacer 10, a rotation torque is transmitted from the bolt 1 to the spacer 10 through the adhesive agent S which is a torque transmitting means provided between the both so that the bolt 1 and the spacer 10 are rotated integrally in the normal direction.

Figure 5:
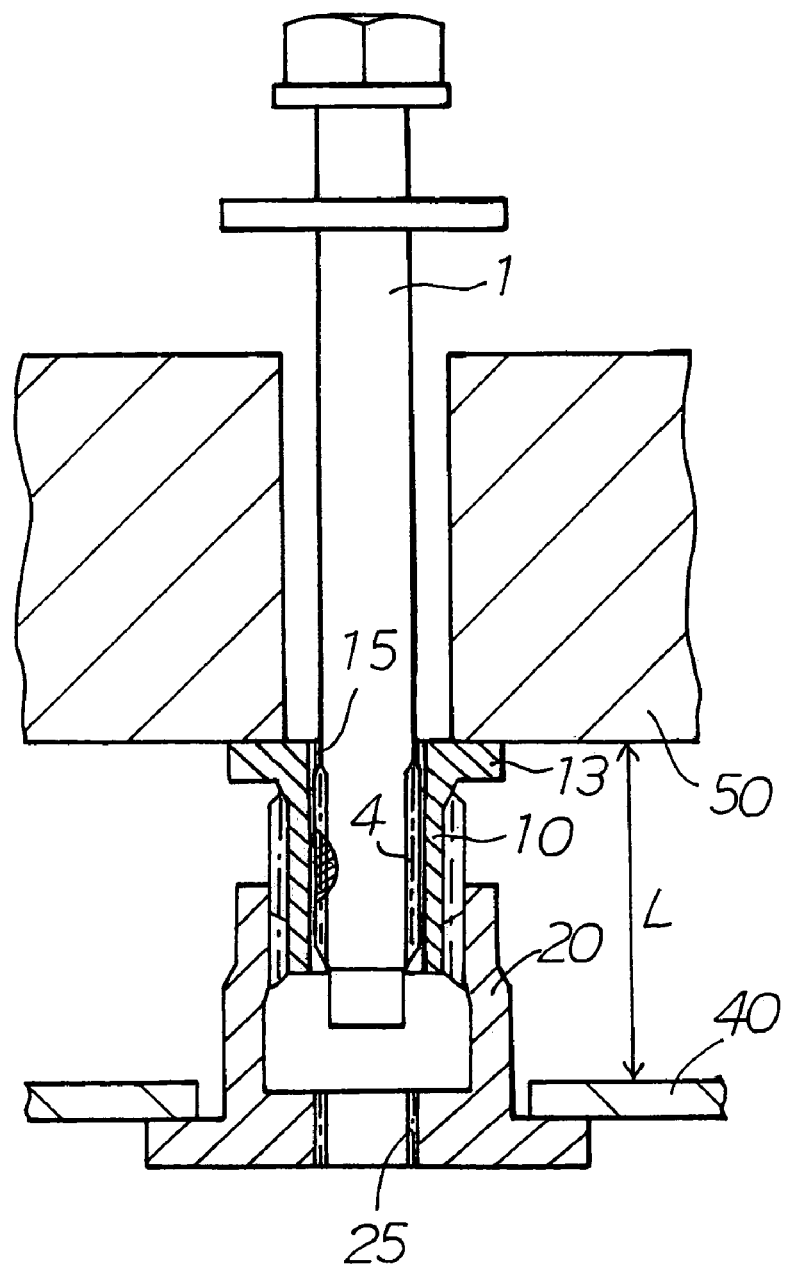
FIG. 5 is a sectional view showing a condition in which the spacer makes a contact with a second member.
Figure 6:
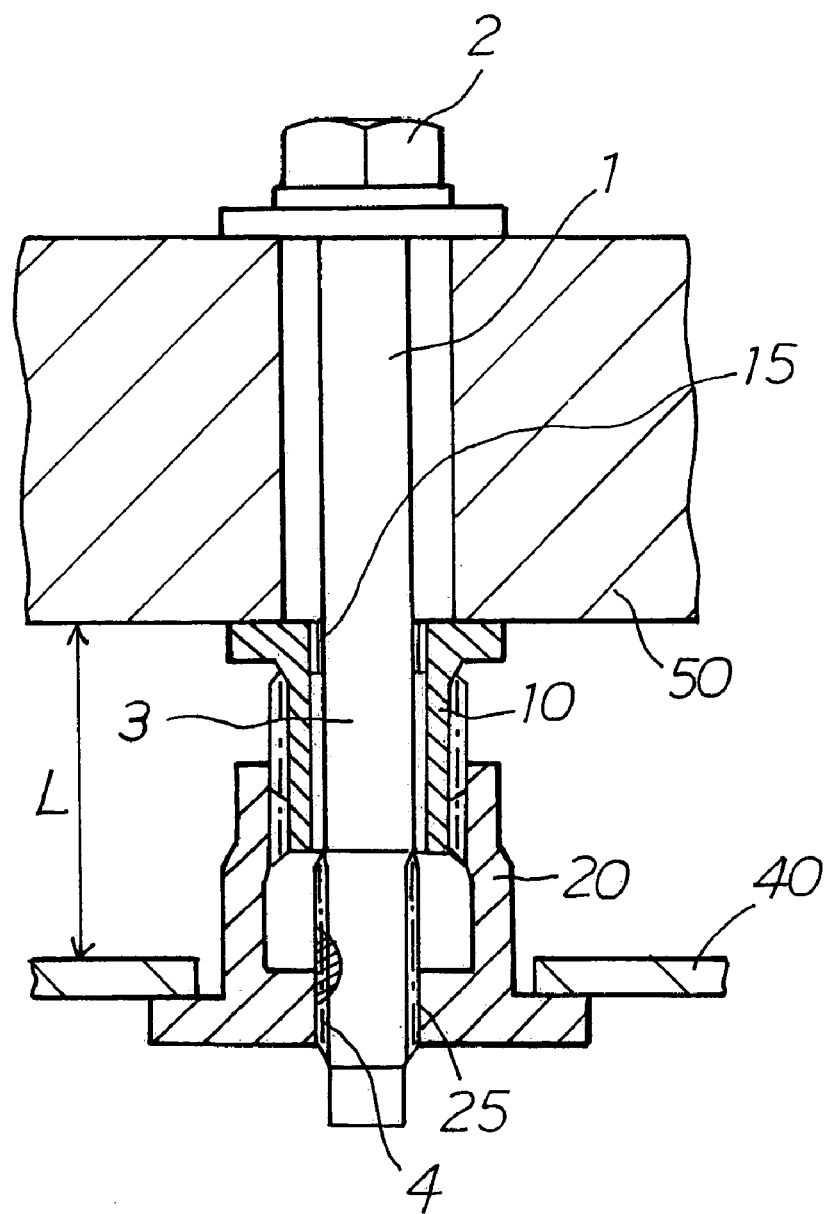
FIG. 6 is a sectional view showing a completion condition of the fastening.

Due to the rotation of this spacer 10, the spacer 10 screw-fastened with the sleeve 20 through the inverse screw is rotated in a loosening direction so that it is moved in the direction of escaping from the sleeve 20. Then, as shown in FIG. 5, the spacer 10 moves until the sheet-like portion 13 makes contact with the second member 50. When the position shown in FIG. 5 is reached, the spacer 10 reaches a condition in which it is never rotated further due to friction resistance. Thus, if a predetermined torque is applied to the bolt 1, the male screw portion 4 of the bolt 1 passes through the female screw portion 15 of the spacer 10 and escapes therefrom, so that as shown in FIG. 6, it advances further and is screwed through the female screw portion 25 of the sleeve 20.

Because as described above, the inside diameter d2 of the female screw portion 15 of the spacer 10 is larger than the diameter d1 of the cylindrical shaft portion 3 of the bolt 1, after the cylindrical shaft portion 3 of the bolt 1 passes through the female screw portion 15 of the spacer 10 and escapes therefrom, it can pass through the female screw portion 15 of the screw hole 14 smoothly. Although the threads of the male screw portion 4 and the female screw portion 15 do not engage completely, there is no problem in terms of fastening strength because this condition is not a final fixing condition.

The bolt 1 advances until its male screw portion 4 reaches the female screw portion 25 formed in the screw hole 24 of the sleeve 20 and the male screw portion 4 screw-fastens with the female screw portion 25 of the sleeve 20. Consequently, the first member 40 can be installed to the second member 50 strongly with an interval L1. Because at this time, the adhesive agent S applied to the male screw portion 4 of the bolt 1 adheres to the inside of the screw hole 24 of the sleeve 20 also, there is obtained an auxiliary effect of blocking loosening between the female screw portion 25 formed in the screw hole 24 and the male screw portion 4.

As described above, because as for the fastening device of this embodiment, the inside diameter d2 of the female screw portion 15 of the spacer 10 is larger than the diameter d1 of the cylindrical shaft portion 3 of the bolt 1, the cylindrical shaft portion 3 of the bolt 1 can pass through the screw hole 14 of the spacer 10 smoothly, so that the cylindrical shaft portion 3 of the bolt 1 does not need to be reduced in diameter by cutting or the like. For the reason, a bolt produced by normal rolling processing can be employed, so that the fastening device can be provided at a lower cost than conventionally.

Second Embodiment

Figure 7:
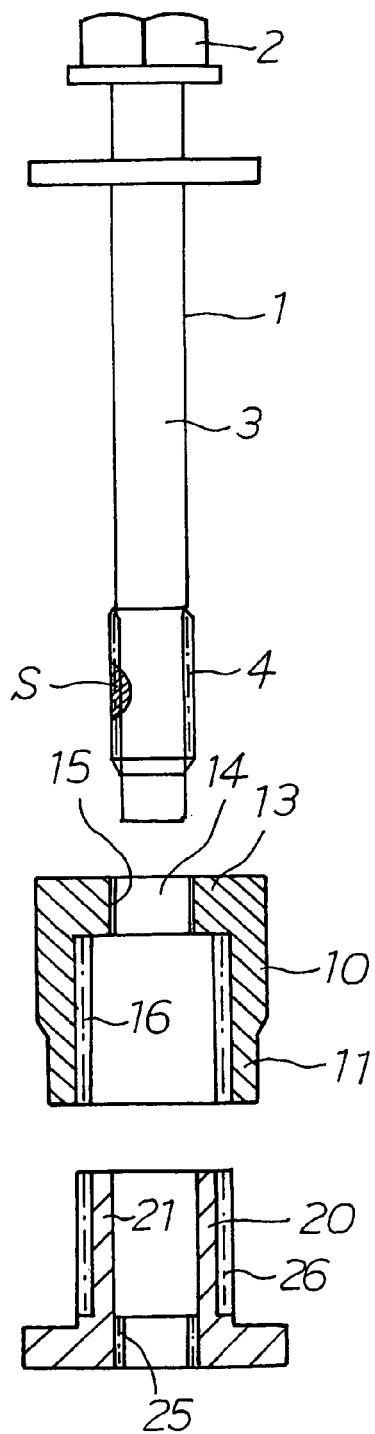
FIG. 7 is a disassembly diagram showing a fastening device of a second embodiment.
Figure 8:
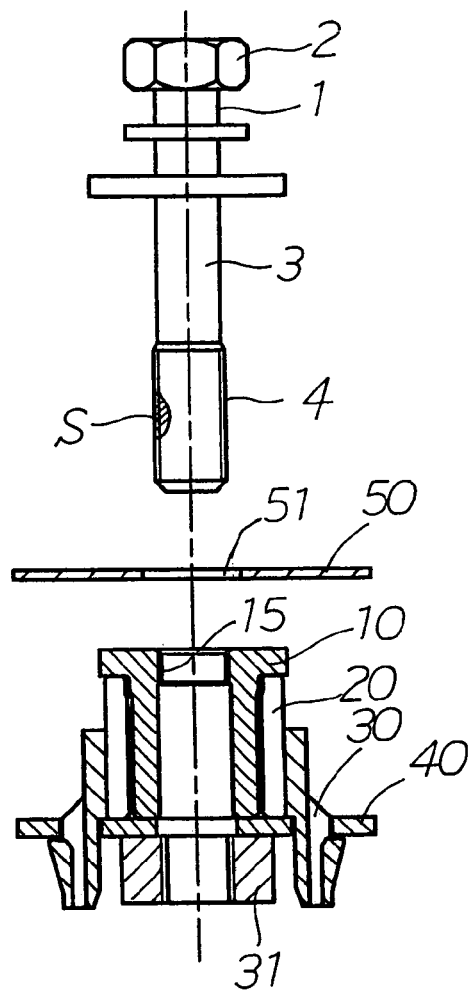
FIG. 8 is a sectional view showing the initial stage of fastening with a fastening device of a third embodiment.

Although according to the first embodiment, the diameter of the sleeve 20 is set larger than the diameter of the spacer 10 and the both are screw-fastened with each other under conditions in which the spacer 10 is accommodated within the sleeve 20, according to the second embodiment shown in FIG. 7, the diameter of the spacer 10 is set larger than that of the sleeve 20, and the spacer 10 and the sleeve 20 are screw-fastened with each other under conditions in which the sleeve 20 is accommodated in the spacer 10. The spacer 10 is comprises of the cylindrical portion 11 and the sheet-like portion 13 provided so as to close one opening portion of the cylindrical portion 11 and the female screw portion 16 is formed in the inner peripheral face of the cylindrical portion 11. The screw hole 14 is made substantially in the central portion of the sheet-like portion 13. The female screw portion 15 capable of screw-fastening with the male screw portion 4 of the bolt 1 is formed in the peripheral face of this screw hole 14.

The sleeve 20 has an outside diameter substantially equal to the inside diameter of the cylindrical portion 11 of the spacer 10 and has a slightly longer cylindrical portion 21 than the cylindrical portion 11. A male screw portion 26 capable of screw-fastening with the female screw portion 16 formed in the inner peripheral face of the cylindrical portion 11 of the spacer 10 is formed in the outer peripheral face of the cylindrical portion 21. According to the second embodiment also, the root diameter d4 of the male screw portion 4 of the bolt 1 is smaller than the diameter d1 of the cylindrical shaft portion 3 and the inside diameter d2 of the female screw portion 15 of the spacer 10 is larger than the diameter d1 of the cylindrical shaft portion 3. Thus, there is a relation of d2>d1>d4.

According to the fastening device of the second embodiment also, the sleeve 20 is fixed to the first member and the bolt 1 is screw-fastened with the spacer 10 screw-fastened with this sleeve 20 through the inverse screw and rotated. The bolt 1 and the spacer 10 are screw-fastened with each other through the male screw portion 4 having the torque transmitting means and the female screw portion 15 of the spacer 10. Because the inside diameter d2 of the female screw portion 15 is larger than the diameter d1 of the cylindrical shaft portion 3 of the bolt 1, after the male screw portion 4 of the bolt 1 passes through the screw hole 14 while screw-fastening with the female screw portion 15 of the spacer 10, the cylindrical shaft portion 3 passes through the screw hole 14 smoothly. The contact area between the spacer 10 and the second member can be increased by forming the spacer 10 in a large diameter.

Third Embodiment

Figure 9:
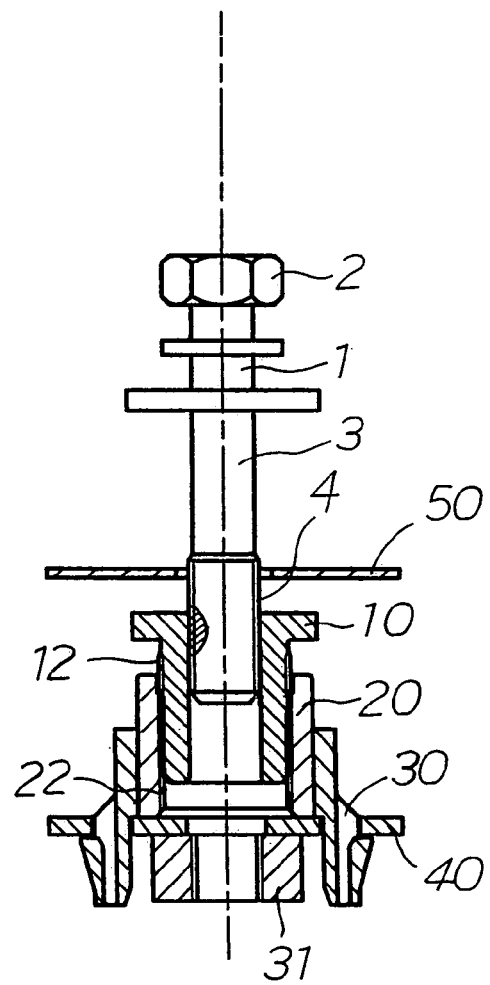
FIG. 9 is a sectional view showing a condition in which the spacer is moved by the rotation of the bolt.

According to the third embodiment shown in FIGS. 8-11, the sleeve 20 is fixed to a first member 40 with a clip 30. A nut 31 is welded on the rear face of the first member 40. The other structure is the same as the first embodiment. As shown in FIG. 9, the bolt 1 is inserted into the female screw portion 15 of the spacer 10 through a through hole 51 of the second member 50 and rotated while transmitting a torque to the spacer 10 through the torque transmitting means so as to move the spacer 10 up to a position corresponding to the second member 50 in FIG. 10. After that, the male screw portion 4 of the bolt 1 is released from the female screw portion 15 of the spacer 10 and the bolt 1 is advanced and then, it is screw-fastened with a nut 31 welded on the rear face of the first member 40.

Because according to the third embodiment, the root diameter d4 of the male screw portion 4 of the bolt 1 is smaller than the diameter d1 of the cylindrical shaft portion 3 and the inside diameter d2 of the female screw portion 15 of the spacer 10 is larger than the diameter d1 of the cylindrical shaft portion 3 of the bolt 1, there is a relation of d2>d1>d4. Although according to the first embodiment, the female screw portion 25 is formed in the spacer 20, the third embodiment is different from the first embodiment in that the nut 31 is employed.

Fourth Embodiment

Figure 12:
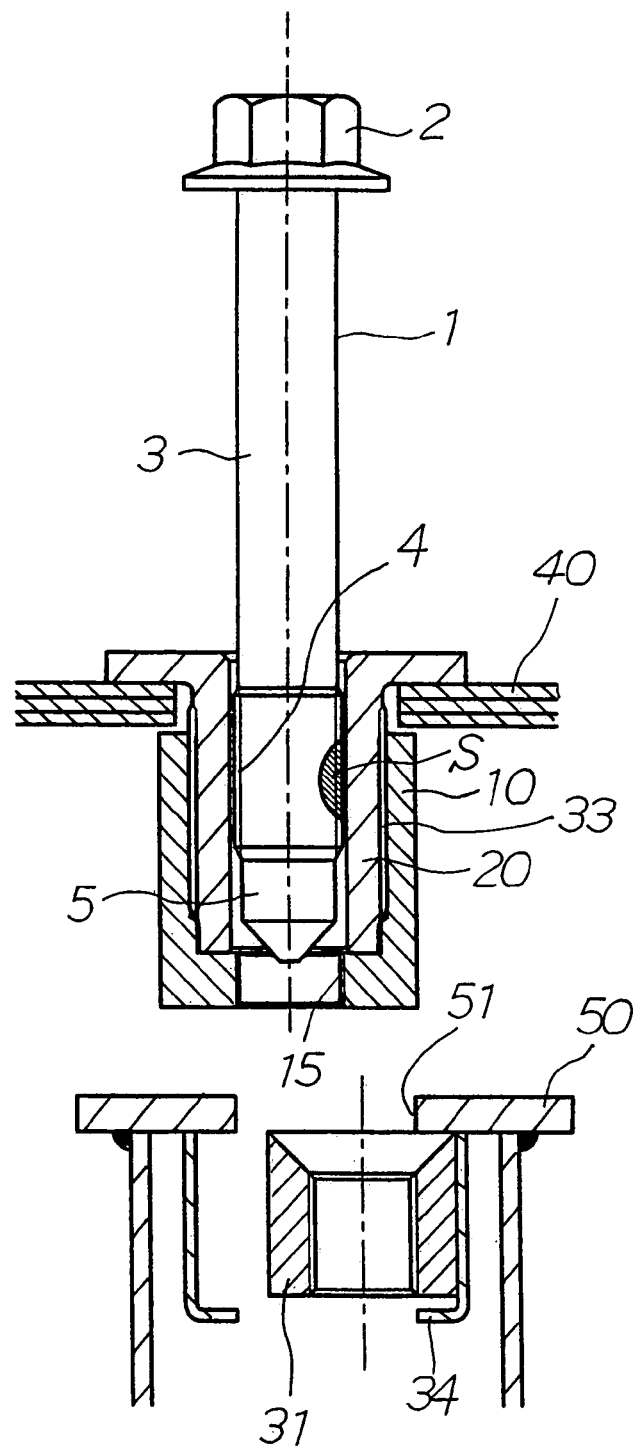
FIG. 12 is a sectional view showing the initial stage of fastening with a fastening device of a fourth embodiment.

According to the above respective embodiments, an inverse screw is employed between the spacer 10 and the sleeve 20 and the bolt head portion of the spacer 10 is moved by a rotation of the bolt 1. However, as indicated in this embodiment, it is permissible to employ a normal screw between the spacer 10 and the sleeve 20. That is, as shown in FIG. 12, the sleeve 20 fixed on the first member 40 has the spacer 10 which is screw-fastened therewith through a normal screw portion 33 provided on the outer peripheral portion.

Figure 13:
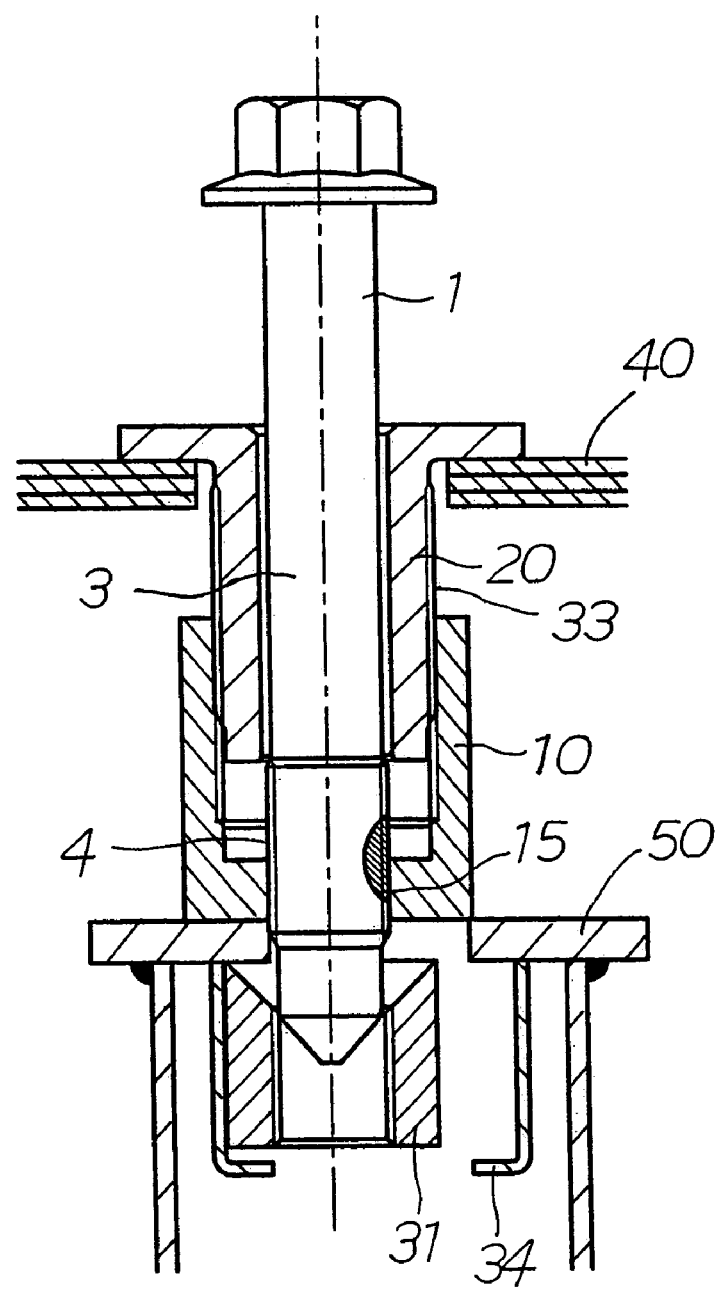
FIG. 13 is a sectional view showing a condition in which the spacer makes a contact with the second member.
Figure 14:
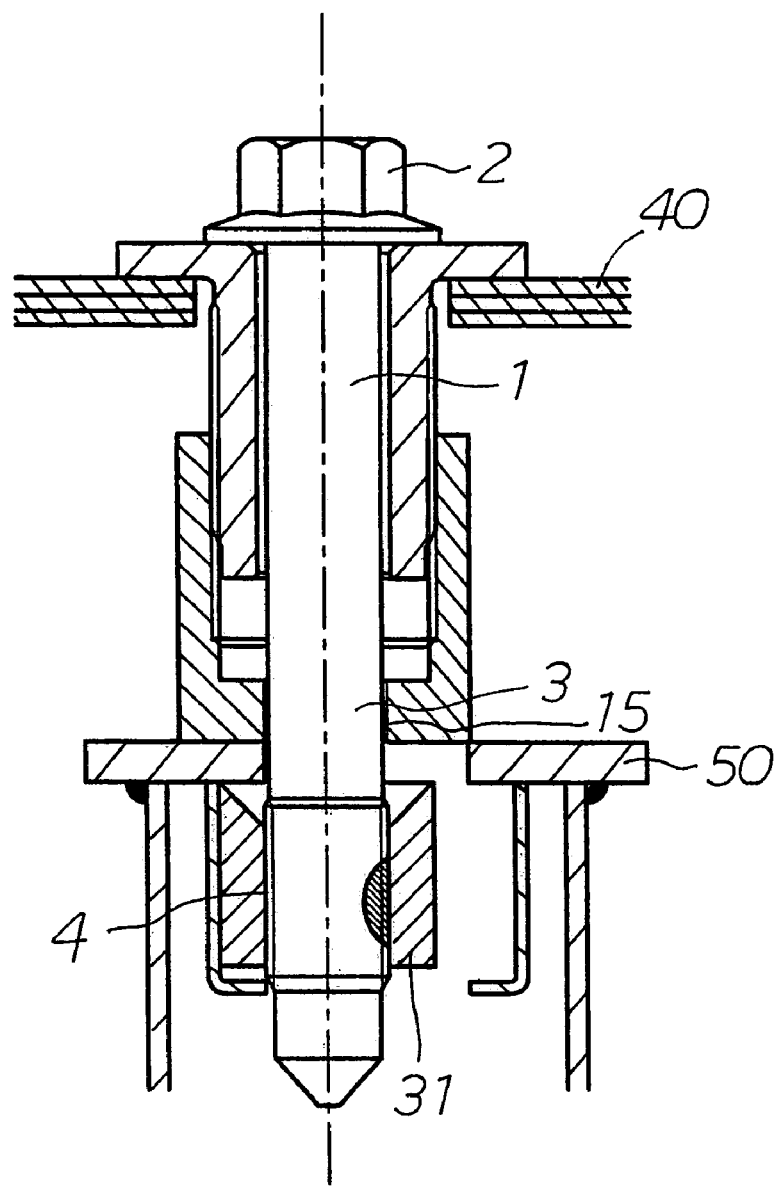
FIG. 14 is a sectional view showing a completion condition of the fastening.

Thus, if the bolt 1 having the torque transmitting means is driven into the male screw portion 4 so as to rotate the spacer 10, the spacer 10 is moved to the front end side of the bolt 1 as shown in FIG. 13 and strikes a second member 50 so that it is stopped. According to this embodiment, a nut 31 is held by a nut holder 34 on the rear face of the second member 50 such that it is capable of being played within a certain area, the nut is automatically centered by the front end portion of the bolt 1. Thus, if the bolt 1 is driven further from the condition of FIG. 13, the male screw portion 4 of the bolt 1 is released from the female screw portion 15 of the spacer 10, so that it is screw-fastened with the nut 31 on the rear face of the second member 50 and the fastening is completed.

Fifth Embodiment

Although the above-described respective embodiments all employ the spacer 10 and the sleeve 20, an example that no sleeve 20 is employed will be described as the fifth embodiment shown in FIGS. 15-18. That is, according to the fifth embodiment, the first member 40 is directly provided with a female screw 70 and as shown in FIG. 15, the spacer 10 is driven into this female screw 70 together with the bolt 1. The female screw 70 is of a normal screw and the spacer 10 moves until its front end comes into a contact with the second member 50 as shown in FIG. 16. Although not shown, according to this embodiment, by modifying part of the thread of the male screw portion of the bolt 1, a torque transmitting means is produced.

Because the spacer 10 cannot rotate if the condition shown in FIG. 16 is reached, the male screw portion 4 of the bolt 1 is released from the female screw portion 15 of the spacer 10 and advanced as shown in FIG. 17, so that it is screw-fastened with the nut 31 welded on the rear face of the second member 50 and the fastening is completed. According to the fourth and fifth embodiments also, the root diameter d4 of the male screw portion 4 of the bolt 1 is smaller than the diameter d1 of the cylindrical shaft portion 3 and the inside diameter d2 of the female screw portion 15 of the spacer 10 is larger than the diameter d1 of the cylindrical shaft portion 3 of the bolt 1, there is a relation of d2>d1>d4 like the other embodiments.

The fastening devices of all the above-described embodiments can be manufactured with only rolling at a low coat without post processing of the bolt 1. Further, two separate members can be fixed together with a relative interval like the conventional products. Needless to say, the nut 31 which can be played like the fourth embodiment can be used for the third embodiment and the fifth embodiment.

What is claimed is:

1. A fastening device for fastening a first member and a second member, the device comprising:
    a bolt having a male screw thread portion located at a front end of a cylindrical shaft portion thereof and a head at a rear end thereof, the male screw thread portion having a triangular cross-sectional shape;
    a spacer comprising a first, female screw thread portion engageable with the male screw thread portion of the bolt, and a second, male screw thread;
    torque transmitting means between the bolt and the spacer, the torque transmitting means providing a frictional resistance between the male screw thread portion of the bolt and the first screw thread portion of the spacer, and for transmitting a rotation force of the bolt to the spacer such that the bolt and spacer are rotated integrally;
    a first member comprising first and second sides and having a first throughhole extending between the first and second sides;
    a sleeve comprising a female screw thread aligned with the first throughhole of the first member, the second screw thread of the spacer engageable with female screw thread of the sleeve;
    a clip removably fixing the sleeve to the first side of the first member;
    a nut fixed to the second side of the first member, the nut comprising a female screw thread aligned with the first throughhole of the first member; and
    a second member comprising first and second sides and a second throughhole extending between the first and second sides, the cylindrical shaft portion of the bolt extending through the second throughhole;
    wherein the second screw thread of the spacer is screw-fastened with the female screw thread of the sleeve such that when the spacer receives a rotation torque from the bolt through the torque transmitting means, the spacer rotates, thereby moving the spacer to a position apart from the first side of the first member into contact with the second side of the second member, so that when the spacer moves to a position in which the spacer contacts the second member, and when the bolt continues receiving torque, the bolt overcomes the torque-transmitting means and moves relative to the spacer, and the male screw thread portion of the bolt is released from the first, female screw thread portion of the spacer;
    wherein, after the male screw thread portion of the bolt is released from the first, female screw thread portion of the spacer, the bolt is movable through the spacer and the sleeve towards the female screw thread of the nut, such that when the male screw thread portion of the bolt engages the female screw thread of the nut, and torque is applied to the bolt, the male screw thread portion of the bolt screw-fastens to the female screw thread of the nut, and the head of the bolt engages the first side of the second member, thereby fixing the first member relative to the second member;
    wherein the first female screw thread portion of the spacer has a trapezoidal cross-sectional shape, thereby enlarging the inner diameter of the spacer, the root diameter of the male screw thread portion of the bolt is smaller than the diameter of the cylindrical shaft portion in the region in which the bolt passes through the spacer, the inside diameter of the first, female screw thread portion of the spacer is larger than the diameter of the cylindrical shaft portion of the bolt, and the male screw thread portion of the bolt has an axial length that is shorter than the axial length of the spacer.

2. The fastening device according to claim 1, wherein the second screw thread of the spacer is a left-hand thread.

3. The fastening device according to claim 1, wherein the second screw thread of the spacer is a right-hand thread.

* * * * *